US010058165B2

(12) United States Patent
Lee

(10) Patent No.: US 10,058,165 B2
(45) Date of Patent: Aug. 28, 2018

(54) BUCKET HOLDER

(71) Applicant: Wallace Keith Lee, Canton, MS (US)

(72) Inventor: Wallace Keith Lee, Canton, MS (US)

( * ) Notice: Subject to any disclaimer, the term of this patent is extended or adjusted under 35 U.S.C. 154(b) by 0 days.

(21) Appl. No.: 15/134,389

(22) Filed: Apr. 21, 2016

(65) Prior Publication Data

US 2017/0303671 A1    Oct. 26, 2017

(51) Int. Cl.
*A45F 5/00*    (2006.01)
*A45F 5/02*    (2006.01)
*F16M 13/04*   (2006.01)

(52) U.S. Cl.
CPC ............. *A45F 5/021* (2013.01); *F16M 13/04* (2013.01)

(58) Field of Classification Search
CPC ...... Y10S 224/904; A45F 5/021; A45F 5/102; A45F 2200/0575; A45F 2200/0566; B44D 3/14
USPC ........................ 224/268, 271, 242, 245, 925
See application file for complete search history.

(56) References Cited

U.S. PATENT DOCUMENTS

| 5,176,302 | A  | * | 1/1993 | Smith ...................... A45F 5/02 224/667 |
| 5,385,281 | A  |   | 1/1995 | Byrd |
| 6,508,390 | B1 |   | 1/2003 | Karpati |
| 7,314,153 | B2 |   | 1/2008 | Musarella |

* cited by examiner

*Primary Examiner* — Adam Waggenspack

(57) ABSTRACT

A bucket holder is presented for mounting to a user's clothing article, such as a belt. The bucket holder comprises a belt holding portion and a handle holding portion with an outer wire entrance. The belt holding portion has a belt slot that is configured to place a user's belt through. The handle holding portion comprises a grip slot that is configured to mount a bucket handle having a wire portion and a grip. The bucket holder is designed to first place the wire portion through the outer wire entrance and then slid the grip into the grip slot. The handle holding portion further comprises a first wire slot and a second wire slot. The first wire slot configured to hold the wire portion when the outer entrance is facing upward, and the second wire slot configured to hold the bucket holder when the outer wire entrance is facing downward.

3 Claims, 9 Drawing Sheets

BUCKET HOLDER

CROSS-REFERENCE TO RELATED APPLICATIONS

Not applicable.

FEDERALLY SPONSORED RESEARCH

Not applicable.

BACKGROUND

Field of Invention

The invention relates to a holder for a bucket and more particularly to a bucket holder with a belt slot that a belt can be placed through to mount the bucket holder on a user's belt.

Prior Art

Belt mounted holders are often made to carry tools used by carpenters, tradesmen, and handymen the tool holder placed in or on a belt secured around the individuals waist. This allows the user easy access to the tools and freeing the hands for more urgent tasks, such as climbing, until the tools are needed.

Some holders may have one or more flip out panels with apertures designed to support containers The inventions may also include wires and rods to support these containers.

Other bucket holders may provide for the carriage of at least one can, such as a paint can, and a variety of additional tools and equipment. The paint can holders may include one or more harnesses used to secure the paint can.

It is therefore contended that a need exists for a new and improved type of bucket holder that does not require wires, rods, buckets holding belts or harnesses, or flip out panels. The current invention provides a simple invention with out the inherent drawbacks and disadvantages of the known prior art. It is further contended that the current bucket holder should be easy to use and inexpensive to manufacture.

SUMMARY OF THE INVENTION

It is therefore a primary object of the present invention to provide a bucket holder that is mounted on a user's belt that allows the user to easily carry a bucket or other items.

It is another object of the present invention to provide a bucket holder that may be easily installed and placed in operation by the user.

Still another object of the present invention is to provide a bucket holder that does not require any modifications or the adjustment of wires, rods, belts or harness, or flip out panels to carry the intended load.

Presented is a one embodiment of the present invention, a bucket holder comprising a handle holding portion and a belt holding portion with the belt holding portion having a belt hold means and the handle holding portion having at least a grip slot in which the grip of a bucket handle can be inserted. The bucket holder may have a grip ridge slot in which a grip ridge (i.e., a raised ridge running circumferentially about the center of the handle) may be placed while the bucket is carried. Further the handle holding portion may also comprise a first wire slot and a second wire slot. The first and second wire slots are configured to carry the wire portion of the bucket handle when the grip is not used or on bucket handles without a grip. The wire portion of the bucket handle is inserted in an outer wire entrance and the grip then moved into the grip slot. For handles without a grip, once the wire portion is inserted into the outer wire entrance, it is then placed in the wire slot facing upward, either the first wire slot or the second wire slot. The grip slot, the first wire slot and the second wire slot are open at a first end and a second end of the bucket holder allowing the grip and the wire portion to move into and out of each slot. Although the bucket holder is discussed with reference to a bucket having a wire portion and those with and without a grip, the bucket holder may be used to carry other items with a closed loop handle that will fit into the outer wire entrance.

The invention itself together with additional objects and advantages thereof, will be best understood from the following description of the embodiments when read and understood in connection with accompanying drawings.

BRIEF DESCRIPTION OF THE DRAWINGS

In describing various examples of the present invention and, together with the detailed description, the accompanying drawings, which are incorporated in and form part of the specification and serve to explain the principles of the invention as illustrated in the following.

DETAILED DESCRIPTION OF PREFERRED EMBODIMENTS

Figure 1:
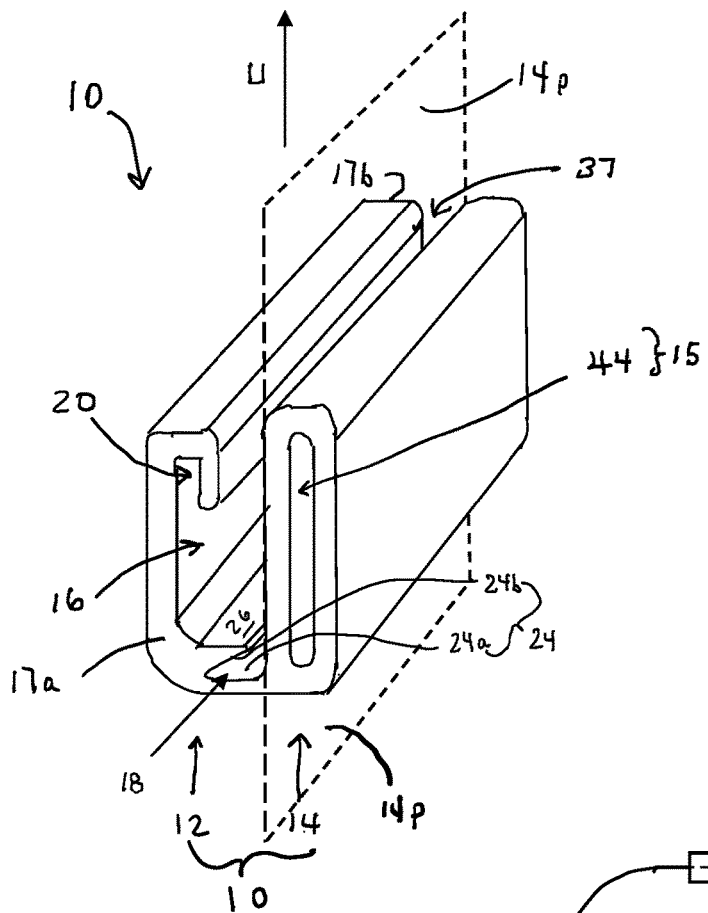
FIG. 1 is a prospective view for the present invention.

Presented is a one embodiment of the present invention, a bucket holder 10 shown in FIG. 1. The bucket holder 10 designed is for a bucket 11 having a bucket handle 11$h$. The handle may comprise a wire portion 11$w$ and a grip 11$g$ for the hand, or the handle may only comprise the wire portion 11$w$. Looking again to FIG. 1, the bucket holder 10 comprises a handle holding portion 12 and a belt holding portion 14, as divided by the dashed plane 14$p$, with the belt holding portion having a belt hold means 15, such as a belt loop that is a belt slot 44, and the handle holding portion 12 having at least a grip slot 16.

Figure 3:
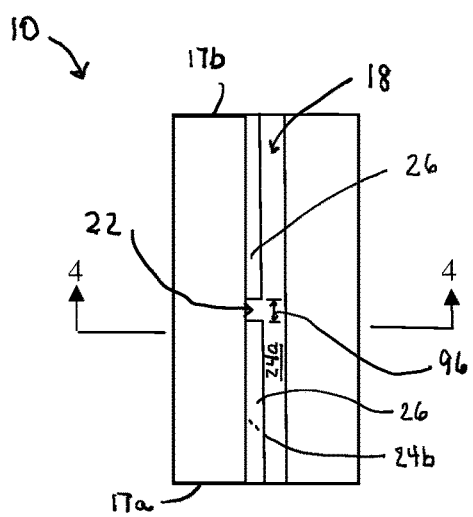
FIG. 3 is a plan view for the present invention looking through the outer wire entrance.
Figure 2:
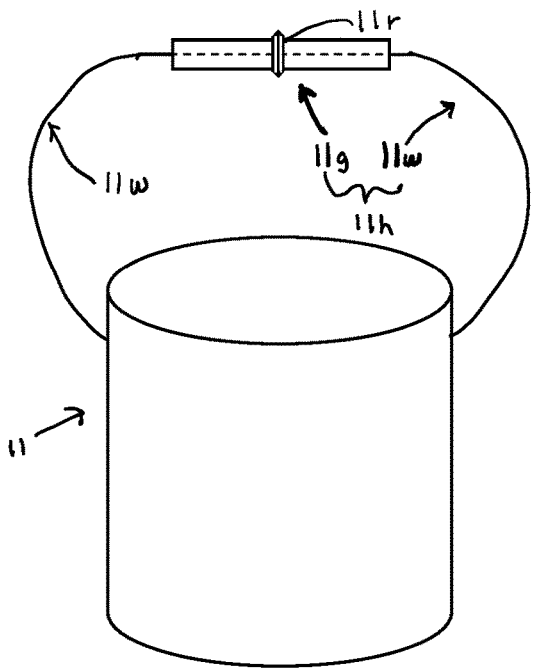
FIG. 2 is a prospective view of a bucket.
Figure 4:
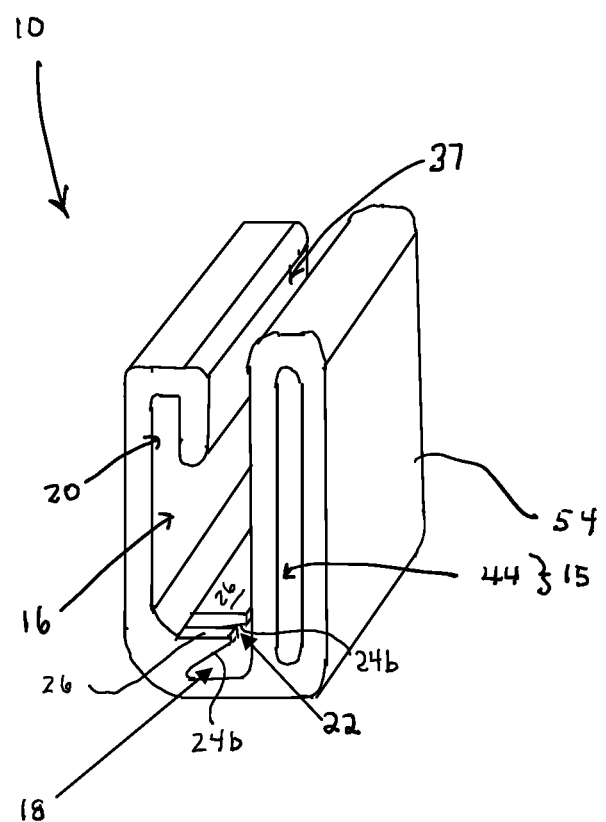
FIG. 4 is a sectional prospective view along line 4-4 of FIG. 3.

The handle holding portion 12 may comprises at least the grip slot 16, but preferably also a first wire slot 18, a second wire slot 20 and a grip ridge slot 22 shown in FIGS. 3 and 4. Looking again to FIGS. 1 and 2, the grip slot 16 is open at a first end 17a and a second end 17b, and has an outer wire entrance 37 that allows the wire portion 11w of bucket handle 11h to be inserted through the outer wire entrance 37 and once the wire portion 11w is in the grip slot 16, the grip 11g of the bucket 11 is moved into the grip slot 16 through the first end 17a or the second end 17b with a grip ridge 11r of the grip 11g resting in the grip ridge slot 22 shown in FIGS. 3 and 4. When the bucket handle 11h does not have a grip 11g, the wire portion 11w of the bucket handle 11h may be placed in the first wire slot 18 or in the second wire slot 20, whichever is facing in an up direction U a shown in FIG. 1.

Figure 5:
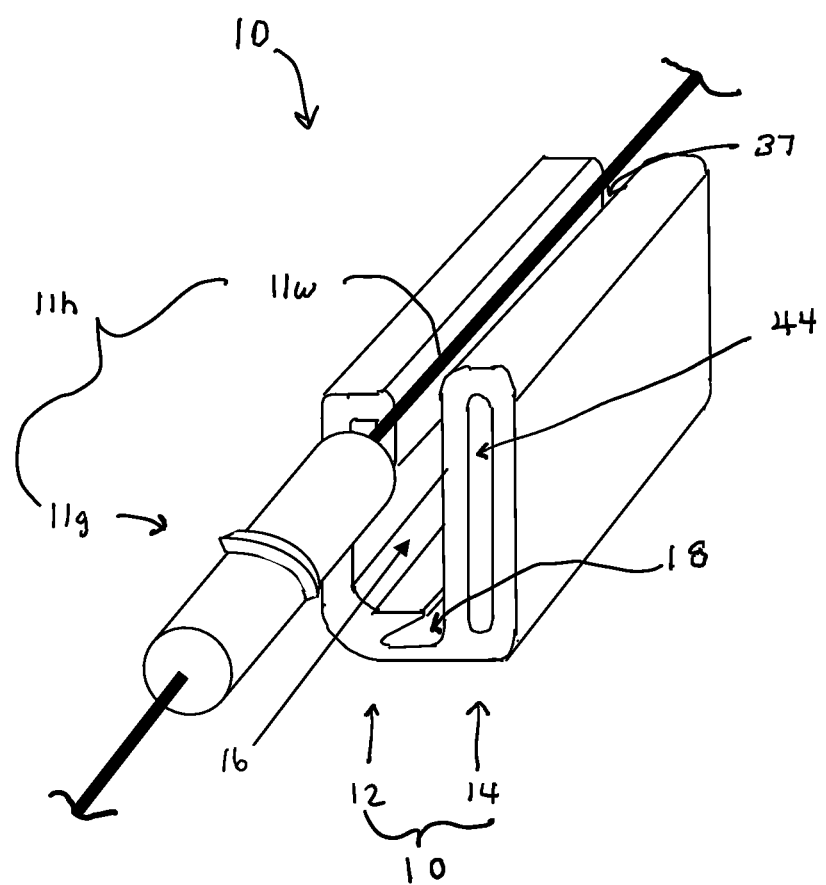
FIG. 5 is a prospective view of the present invention showing the wire portion being inserted in the outer wire entrance.
Figure 6:
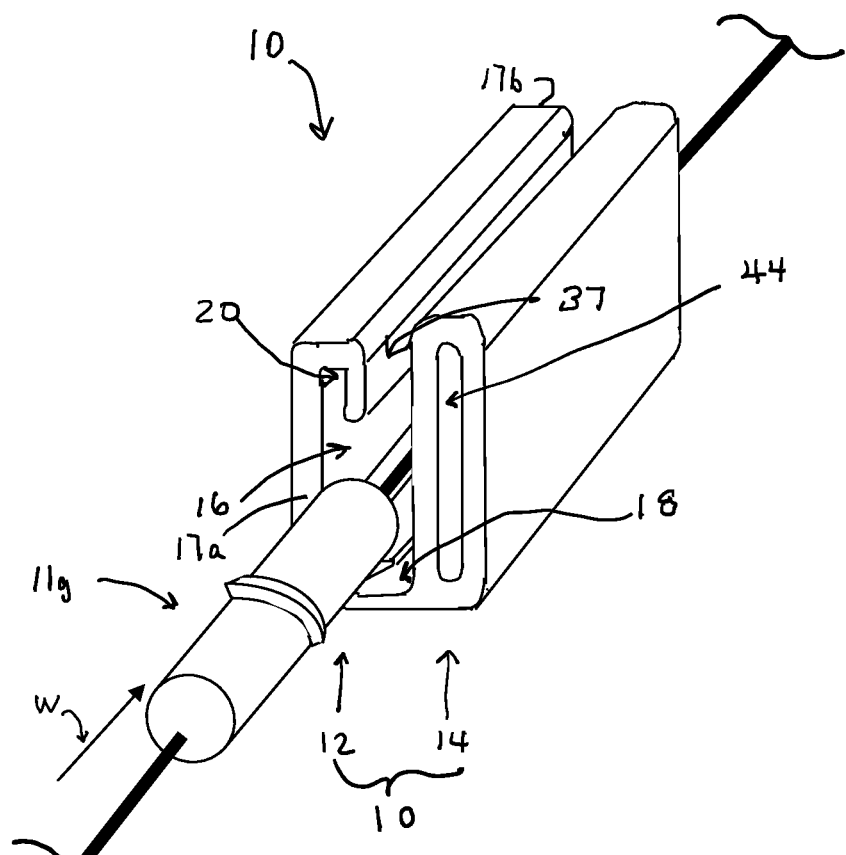
FIG. 6 is a prospective view of the present invention showing the grip being inserted in the grip slot.
Figure 7:
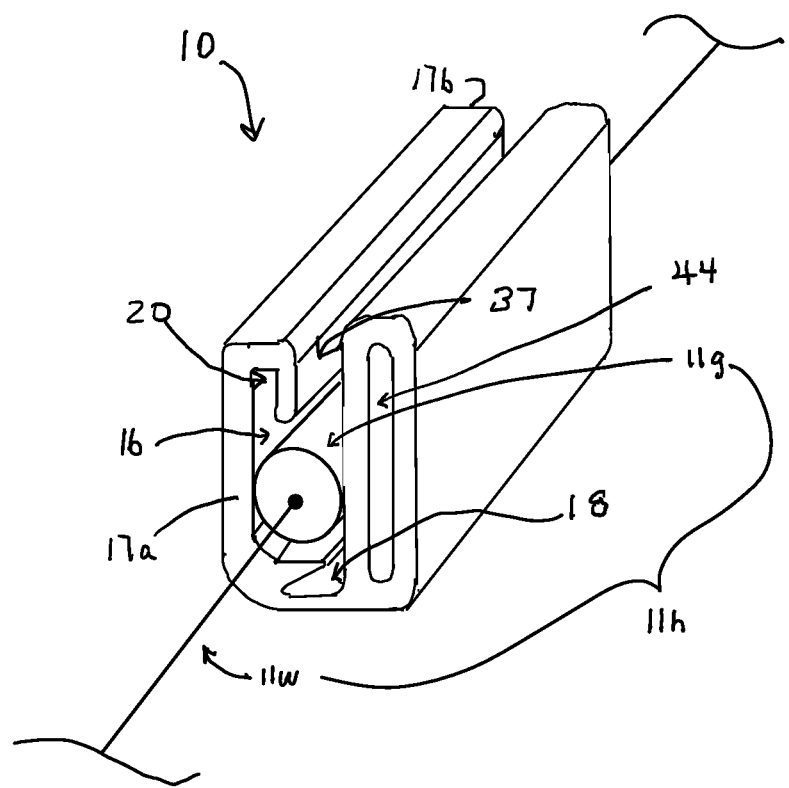
FIG. 7 is a prospective view of the present invention showing the grip resting in the grip slot.
Figure 8:
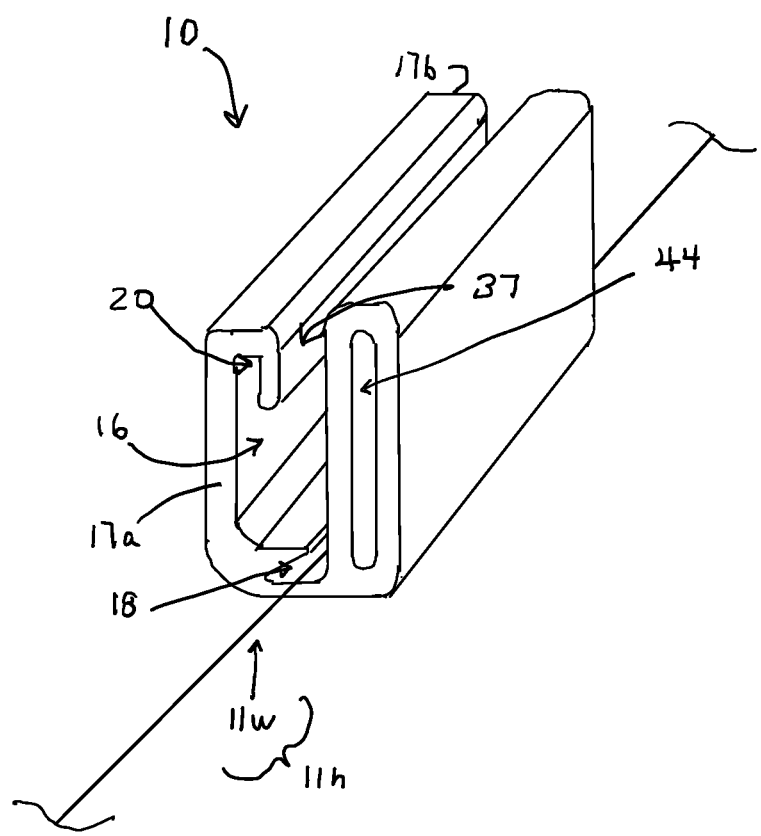
FIG. 8 is a prospective view of the present invention showing the wire being inserted in the first wire slot.
Figure 9:
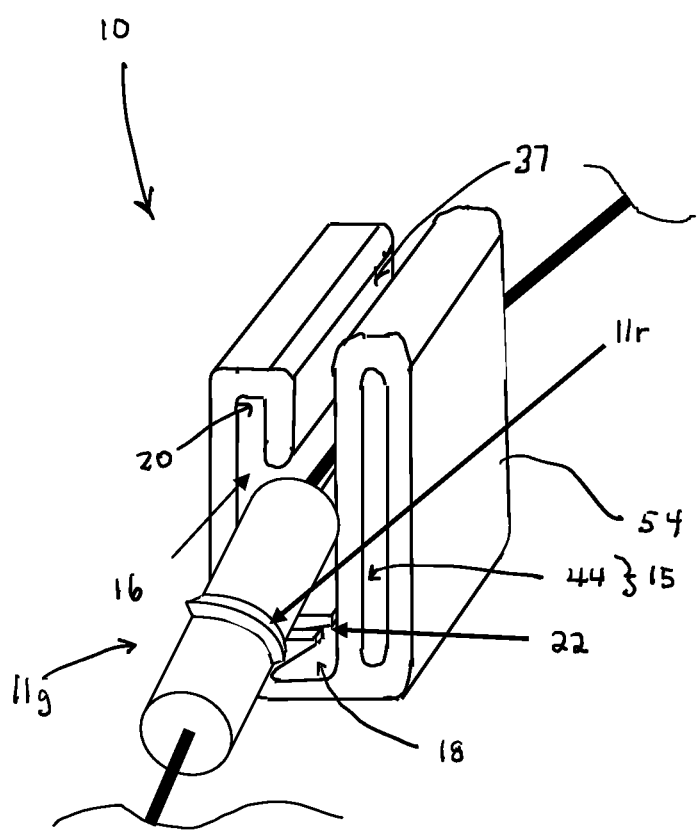
FIG. 9 is a prospective view of the present invention showing the grip ridge of the grip being inserted in the grip ridge slot.

Looking to FIG. 5 the wire portion 11w (i.e. the wire) of the bucket handle 11h is initially placed in the outer wire entrance 37. Looking to FIG. 6, the grip 11g is inserted in direction W into the grip slot 16 coming to rest as shown in FIG. 7. Looking to FIG. 8, when the bucket handle 11h consist of only the wire portion 11w, the wire portion 11w, may be placed in to first wire slot 18 or if the bucket holder 10 is inverted into the second wire slot 20. Looking to FIG. 9, the same sectional view of the bucket holder 10 presented in FIG. 4 is again presented showing the grip ridge 11r of the grip 11g inserted in the grip ridge slot 22.

Figure 10:
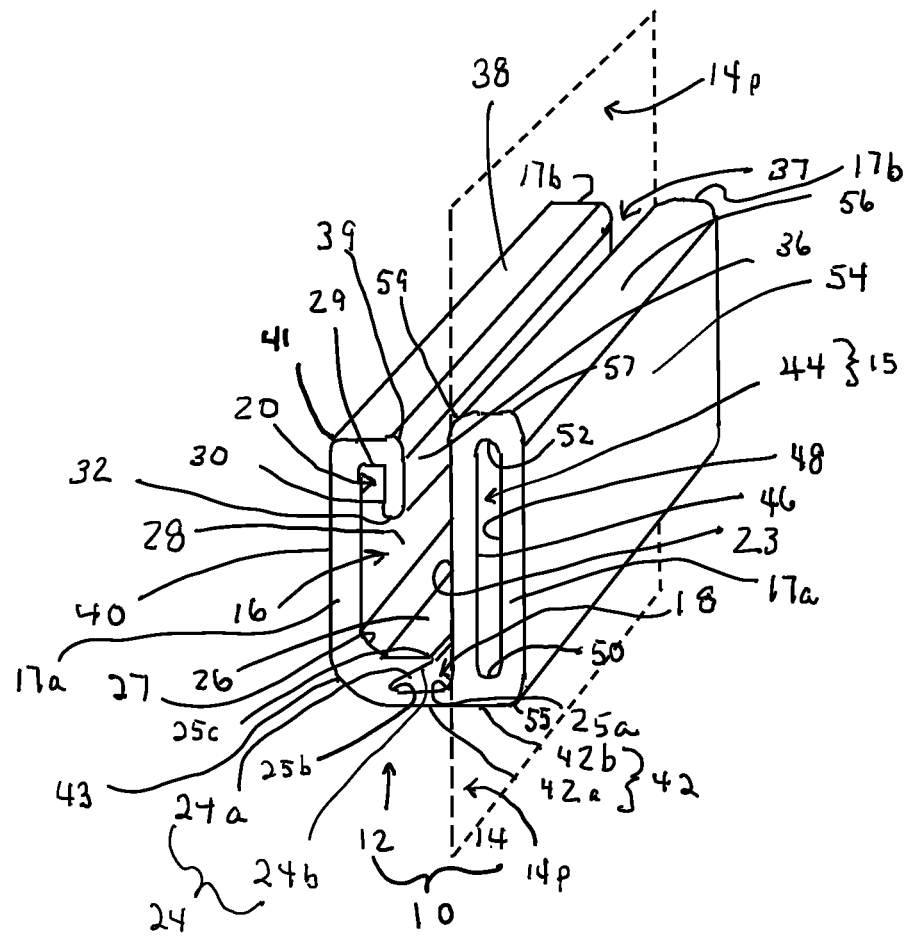
FIG. 10 is a prospective view of the present invention with element numbers.

Looking to FIG. 10, The handle portion 12 further has a grip slot belt side surface 23 connected to a base first wire slot inner surface 24a of a first wire slot surface 24 at a first inner corner 25a. The first wire slot 18 is cut back into the handle holding portion 12 to allow the wire portion 11w of the bucket handle 11h to rest in the first wire slot 18 more securely. The first wire slot surface 24 has the base first wire slot inner surface 24a and an opposite base first wire slot inner surface 24b. The base first wire slot inner surface 24a may be at a 45 degree inner angle to the opposite base first wire slot inner surface 24b. The opposite base first wire slot inner surface 24b is connected to a grip slot lower surface 26 at a third inner corner 25c. The grip slot lower surface 26 connects to a grip slot inner side surface 28 at a fourth inner corner 27. The grip slot inner side surface 28 connects to a second wire slot inner surface 30 at a fifth inner corner 29. A grip slot ridge 32 connects to a wire entrance surface 36 to the second wire slot inner surface 30. The grip slot inner side surface 28 and the second wire slot inner surface 30 form the second wire slot 20 that is u-shaped. The grip slot 16 is formed by the grip slot lower surface 26 connected to the grip slot inner side surface 28 at the fourth inner corner 27, the grip slot inner side surface 28 being opposite the grip slot belt side surface 23. The grip slot ridge 32 being a grip slot upper surface that is U shaped and joins a wire entrance surface 36 to the second wire slot inner surface 30. The wire entrance surface 36 joins a grip slot opposite base outer surface 38 at a first outer corner 39. The wire entrance surface 36 is located opposite the grip slot belt side surface 23 with the outer wire entrance 37 there between. The grip slot opposite base outer surface 38 joins a grip slot outer side surface 40 at a second outer corner 41. The grip slot outer side surface 40 joins a grip slot base outer surface 42a at a third outer corner 43.

The belt holding portion 14 comprises the belt hold means 15, such as the belt slot 44 that a user's belt is placed through. The belt slot runs from the first end 17a to the second end 17b of the bucket holder 10. The belt slot 44 comprises a belt slot first inner surface 46 parallel to a belt slot second inner surface 48 with a belt slot first inner corner surface 50 that is u-shaped and a belt slot second inner corner surface 52 that is u-shaped connecting the belt slot first inner surface 46 to the belt slot second inner surface 48 forming the belt slot 44. The belt holding portion 14 further has a body side surface 54, a belt slot base outer surface 42b, and a belt slot opposite base outer surface 56. The body side surface 54 joins the belt slot base outer surface 42b at a fourth outer corner 55. The body side surface 54 joins belt slot opposite base outer surface 56 at a fifth outer corner 57. The belt slot opposite base outer surface 56 joins the grip slot belt side surface 23 at a sixth outer corner 59. The bucket holder 10 has the first end 17a and the second end 17b with the handle holding portion 12 and the belt holding portion 14 running from the first end 17a to the second end 17b. The first end 17a and the second end 17b may be generally parallel. The grip slot outer side surface 40, the grip slot inner side surface 28, the wire entrance surface 36, the grip slot belt side surface 23, the belt slot first inner surface 46, the belt slot second inner surface 48, and the body side surface 54 may be generally parallel. The base outer surface 42 may be generally perpendicular to the grip slot outer side surface 40, the grip slot inner side surface 28, the wire entrance surface 36, the grip slot belt side surface 23, the belt slot first inner surface 46, the belt slot second inner surface 48, and the body side surface 54; and the base outer surface 42 may be generally parallel to the grip slot opposite base outer surface 38 and belt slot opposite base outer surface 56.

Figure 11:
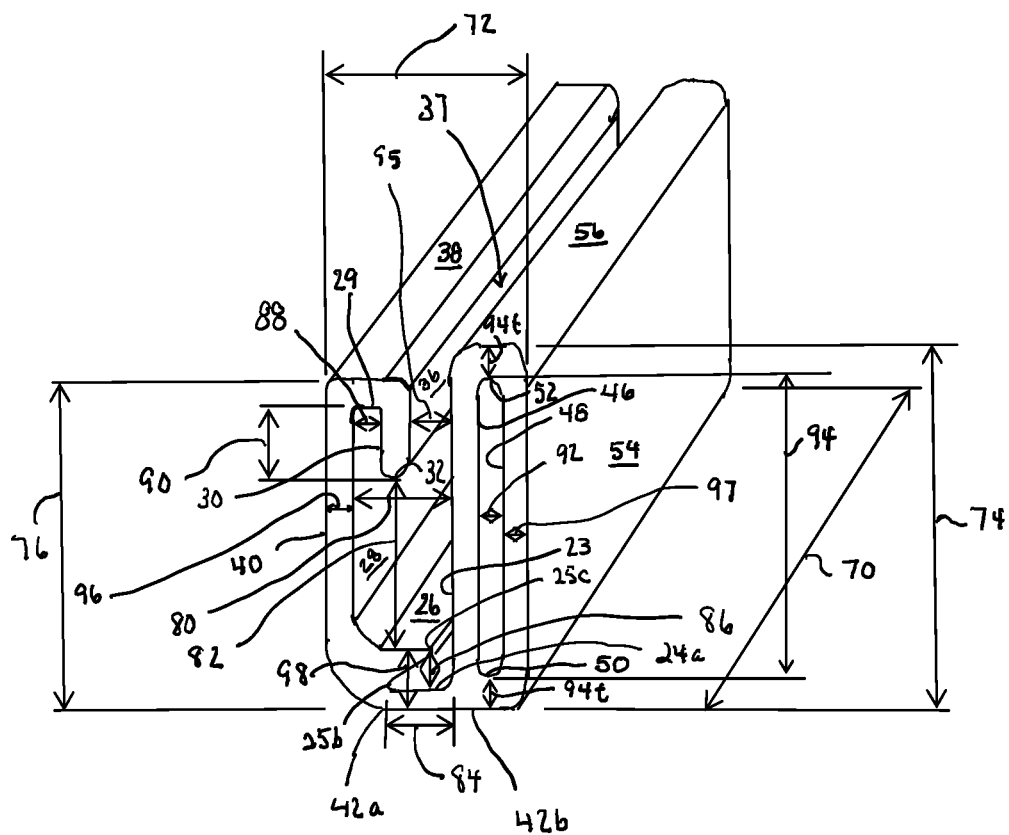
FIG. 11 is a prospective view of the present invention with key dimensions.

Looking to FIG. 11, the one embodiment may have a length 70 of 3 inches as measured from the first end 17a to the second end 17b, and may have a width 72 of 1.5 inches as measure form the body side surface 54 to the grip slot outer side surface 40. The belt holding portion 14 may have a belt holding portion height 74 of 2 inches as measured from the belt slot base outer surface 42b to the belt slot opposite base outer surface 56. The handle holding portion may have a handle holding portion height 76 of 1.75 inches as measured from the grip slot base outer surface 42a to the grip slot opposite base outer surface 38. The grip slot 16 may have a grip slot width 80 of 0.625 inches as measured from the grip slot inner side surface 28 to the grip slot belt side surface 23. The grip slot 16 may have a grip slot height 82 of 0.75 inches as measured from the grip slot lower surface 26 to the grip slot ridge 32. The first wire slot 18 may have a first wire slot length 84 of 0.375 inches as measured from the grip slot belt side surface 23 to the second inner corner 25b. The first wire slot 18 may have a first wire slot width 86 of 0.25 inches as measured from the third inner corner 25c to the base first wire slot inner surface 24a. The second wire slot 20 have a second wire slot width 88 of 0.1875 inches as measured from the grip slot inner side surface 28 to the second wire slot inner surface 30. The second wire slot 20 may have a second wire slot length 90 of 0.3750 inches as measured from the fifth inner corner 29 to the grip slot ridge 32. The belt slot may have a belt slot width 92 of 0.2500 inches as measured from the belt slot first inner surface 46 to the belt slot second inner surface 48. The belt slot may have a belt slot height 94 of 1.625 inches as measured from the belt slot first inner corner surface 50 to the belt slot second inner corner surface 52. The outer wire entrance 37 may have an entrance width 95 of 0.2500 as measured from the grip slot belt side surface 23 to the wire entrance surface 36. The bucket holder 10 may have grip slot sidewall width 96 between 0.1875 and 0.25 inches, preferably 0.25 inches and a belt slot sidewall width 97 between 0.1875 and 0.500 inches, preferably 0.1875 inches. The bucket holder 10 may have a base thickness 98 of 0.50 inches as measured from the grip slot base outer surface 42a to the grip slot lower surface 26. Looking to FIG. 3, the grip ridge slot 22 may have a grip ridge slot width 99 of 0.25 inches. All dimensions are dependant on the design load and the materials used and may be adjusted as required. The dimensions provided are for a bucket holder 10 made of a high density polyethylene designed to carry a gallon of paint. The bucket holder 10 may also be made a variety of material such as: metals (e.g., aluminum, steels, and titanium), plastics (e.g., high density polyethylene), composite materials, or other materials with sufficient strength to carry the design load.

Although the several versions of the present invention have been described in considerable detail with reference to the version thereof, other versions are possible. Therefore, the spirit and scope of the appended claims should not be limited to the description of the preferred version contained herein. Various deviations and modification may be made within the spirit and scope of this invention without departing from the main theme thereof.

What is claimed is:

1. A bucket holder for holding a handle of a bucket comprising a belt holding portion and a handle holding portion; the belt holding portion comprising a belt slot; the belt slot configured to hold an user's belt; the handle holding portion attached to and supported by the belt holding portion and configured to hold the handle of the bucket; the handle holding portion comprising a grip slot and at least a first wire slot; the grip slot being open at a first end and a second end of the bucket holder and configured to receive and hold a grip of a handle of the bucket; the first wire slot being open at the first and second end of the bucket holder and configured to hold a wire portion of the handle; the first wire slot being formed by a grip slot belt side surface, a base first wire slot surface for supporting the wire portion, and an opposite base first wire slot inner surface located above the base first wire slot surface; the opposite base first wire slot inner surface angled towards the belt side surface; the grip slot being formed by a grip slot lower surface for supporting the grip of the handle, a grip slot belt side surface, and a grip slot inner side surface; the grip slot lower surface spaced from the belt side surface and located directly above and connected to the opposite base first wire slot inner surface; the grip slot inner side surface extending upward from one end of the grip slot lower surface; the grip slot belt side surface spaced from the grip slot lower surface so as to form an opening from the grip slot into the first wire slot; the grip slot belt side surface being on an opposite side of the grip slot lower surface from the grip slot inner side surface.

2. The bucket holder according to claim 1 further comprising a grip ridge slot configured to cradle a grip ridge of the grip when the grip is supported by the grip slot lower surface; the grip ridge slot being disposed in the grip slot lower surface.

3. The bucket holder according to claim 2 further comprising a second wire slot, a grip slot upper surface and a wire entrance surface; the grip slot located between the first wire slot and the second wire slot; the second wire slot being open at the first and second end of the bucket holder and configured to hold the wire portion of the handle when the bucket holder is inverted with the wire portion entering the second wire slot from the grip slot; the wire entrance surface configured spaced from the grip slot belt side surface allowing the wire portion of the handle to enter the grip slot there between; the wire entrance surface joined to a second grip slot inner surface by a grip slot upper surface there between; the grip slot upper surface opposite the grip slot lower surface and configured to support the grip of the handle when the bucket holder is inverted; the grip slot upper surface spaced from the grip slot inner side surface allowing the wire portion of the handle to pass from the grip slot there between into the second wire slot.

* * * * *